United States Patent
Kimura

(10) Patent No.: US 10,628,928 B2
(45) Date of Patent: Apr. 21, 2020

(54) IMAGE PROCESSING APPARATUS, IMAGE PROCESSING METHOD, AND STORAGE MEDIUM FOR GAIN ADJUSTMENT

(71) Applicant: CANON KABUSHIKI KAISHA, Tokyo (JP)

(72) Inventor: Naoto Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 15/883,740

(22) Filed: Jan. 30, 2018

(65) Prior Publication Data
US 2018/0225811 A1  Aug. 9, 2018

(30) Foreign Application Priority Data

Feb. 7, 2017 (JP) .................................. 2017-020228

(51) Int. Cl.
*G06T 5/00* (2006.01)
*H04N 5/243* (2006.01)

(52) U.S. Cl.
CPC .............. *G06T 5/009* (2013.01); *H04N 5/243* (2013.01)

(58) Field of Classification Search
CPC .................................. G06T 5/009; H04N 5/243
See application file for complete search history.

(56) References Cited

U.S. PATENT DOCUMENTS

| | | | | |
|---|---|---|---|---|
| 6,137,533 A * | 10/2000 | Azim | .................... | H04N 5/2352 348/222.1 |
| 2004/0109091 A1* | 6/2004 | Park | ........................ | G06T 5/009 348/673 |
| 2007/0286481 A1* | 12/2007 | Monobe | .................. | G06T 5/009 382/169 |
| 2008/0174700 A1* | 7/2008 | Takaba | ..................... | G09G 5/10 348/678 |

(Continued)

FOREIGN PATENT DOCUMENTS

| JP | 2014-68330 A | 4/2014 |
|---|---|---|
| JP | 2014-154108 A | 8/2014 |

OTHER PUBLICATIONS

Ogata et al. ("Dynamic range compression based on illumination compensation," IEEE Transaction on Consumer Electronics, vol. 47, No. 3, Aug. 2001) (Year: 2001).*

(Continued)

*Primary Examiner* — Yubin Hung
(74) *Attorney, Agent, or Firm* — Canon USA, Inc., IP Division

(57) ABSTRACT

Image processing generates reference gain information based on a first tone characteristic by using an input image, the reference gain information including a gain value corresponding to a luminance value for each pixel, the first tone characteristic including a luminance range in which a gain signal monotonically increases; generates a correction signal to correct the reference gain information based on a second tone characteristic in which the gain signal monotonically decreases or monotonically increases regardless of the lumi- (Continued)

nance range by using the input image and a low-frequency image generated from the input image; and performs gain processing on the input image based on gain information obtained after the reference gain information is corrected by the correction signal.

10 Claims, 10 Drawing Sheets

(56) References Cited

U.S. PATENT DOCUMENTS

| | | | | |
|---|---|---|---|---|
| 2008/0252791 | A1* | 10/2008 | Mitsunaga | H04N 5/20 348/673 |
| 2009/0073278 | A1* | 3/2009 | Ogawa | H04N 1/58 348/222.1 |
| 2009/0109233 | A1* | 4/2009 | Kerofsky | G09G 3/2003 345/589 |
| 2010/0053384 | A1* | 3/2010 | Manabe | G06T 5/009 348/254 |
| 2013/0182950 | A1* | 7/2013 | Morales | G06T 5/001 382/167 |
| 2014/0226902 | A1* | 8/2014 | Yamaguchi | G06T 5/008 382/167 |
| 2015/0009246 | A1* | 1/2015 | Watanabe | G09G 3/2092 345/690 |
| 2015/0364111 | A1* | 12/2015 | Zhang | G09G 5/10 345/690 |
| 2016/0366449 | A1* | 12/2016 | Stessen | H04N 9/77 |

OTHER PUBLICATIONS

Cvetkovic et al. ("Non-linear locally-adaptive video contrast enhancement algorithm without artifacts," IEEE Transaction on Consumer Electronics, vol. 54, No. 1, Feb. 2008) (Year: 2008).*

* cited by examiner

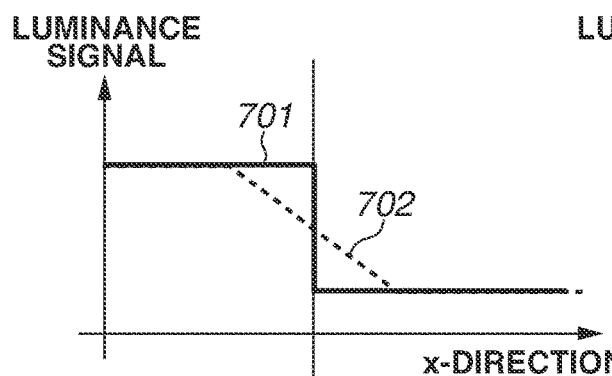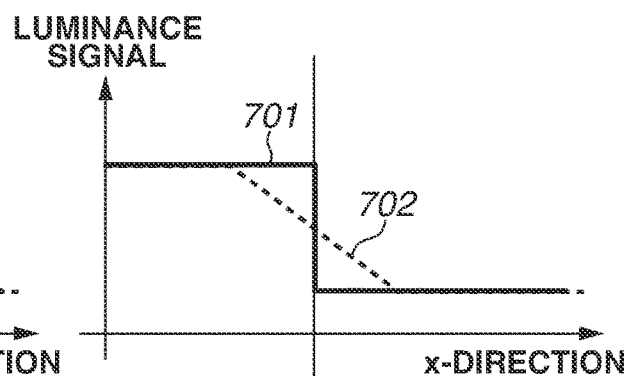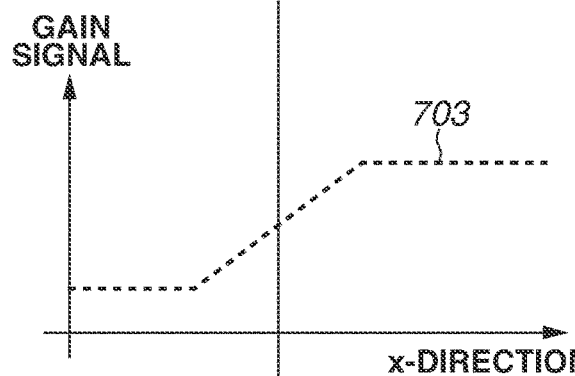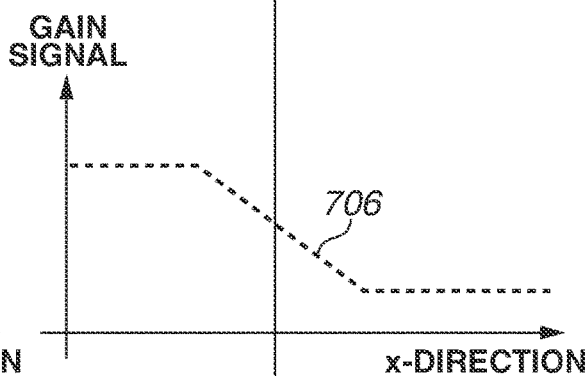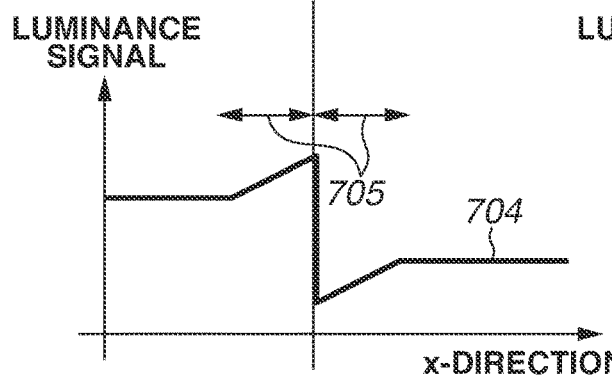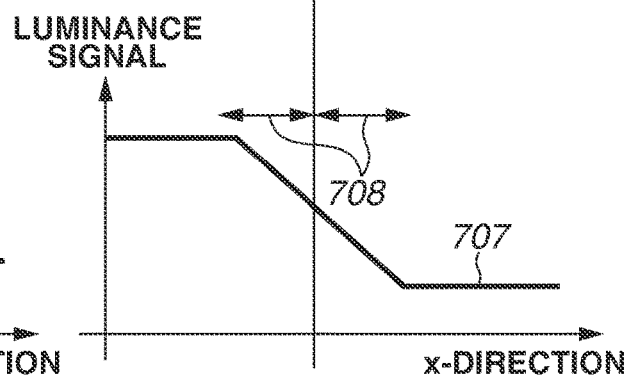

IMAGE PROCESSING APPARATUS, IMAGE PROCESSING METHOD, AND STORAGE MEDIUM FOR GAIN ADJUSTMENT

BACKGROUND

Field of the Disclosure

The present disclosure generally relates to image processing and, more particularly, to an image processing apparatus, an image processing method, and a storage medium for performing image processing such as tone processing.

Description of the Related Art

A local tone mapping technique for generating a low-frequency image from an input image and performing tone processing on the input image based on the low-frequency image to thereby locally improve the contrast of the image has been heretofore known.

For example, an image processing apparatus discussed in Japanese Patent Application Laid-Open No. 2014-68330 generates a plurality of levels of pixel values by repeatedly performing resolution conversion processing on a pixel value of an input image, and corrects the pixel value of the input image for each level based on a difference between the pixel value of the input image and the pixel value for each level. In the image processing apparatus discussed in Japanese Patent Application Laid-Open No. 2014-68330, an image in which the pixel value of the input image is enhanced is generated by utilizing a high frequency component, which corresponds to each of levels of resolutions, in each of the levels of image data having the corrected pixel value.

However, in the technique discussed in Japanese Patent Application Laid-Open No. 2014-68330 described above, a contrast of an image may be reduced as compared with that in global tone mapping processing performed on the entire image such as gamma (γ) conversion, depending on the setting of a tone characteristic used for tone processing.

SUMMARY

According to one or more aspects of the present disclosure, an image processing apparatus includes a first generation unit configured to generate reference gain information based on a first tone characteristic by using an input image, the reference gain information including a gain value corresponding to a luminance value for each pixel, the first tone characteristic including a luminance range in which a gain signal monotonically increases, a second generation unit configured to generate a correction signal to correct the reference gain information based on a second tone characteristic in which the gain signal monotonically decreases or monotonically increases regardless of the luminance range by using the input image and a low-frequency image generated from the input image, and a processing unit configured to perform gain processing on the input image based on gain information obtained after the reference gain information is corrected by the correction signal.

Further features of the present disclosure will become apparent from the following description of exemplary embodiments with reference to the attached drawings.

BRIEF DESCRIPTION OF THE DRAWINGS

FIGS. 7A, 7B, 7C, 7D, 7E, and 7F are graphs each illustrating an example where a contrast is reduced according to one or more aspects of the present disclosure.

DESCRIPTION OF THE EMBODIMENTS

Exemplary embodiments of the present disclosure will be described in detail below with reference to the accompanying drawings.

A first exemplary embodiment will be described below. An image processing apparatus according to the present exemplary embodiment is applicable to, for example, digital cameras, digital video cameras, various mobile terminals including a camera function, such as smart phones and tablet terminals, cameras for industrial use, in-vehicle cameras, and cameras for medical use. Image processing according to the present exemplary embodiment may be implemented not only by a hardware configuration, but also by software in, for example, a personal computer or computerized circuitry configuration(s) built in a digital camera or the like.

Figure 1:
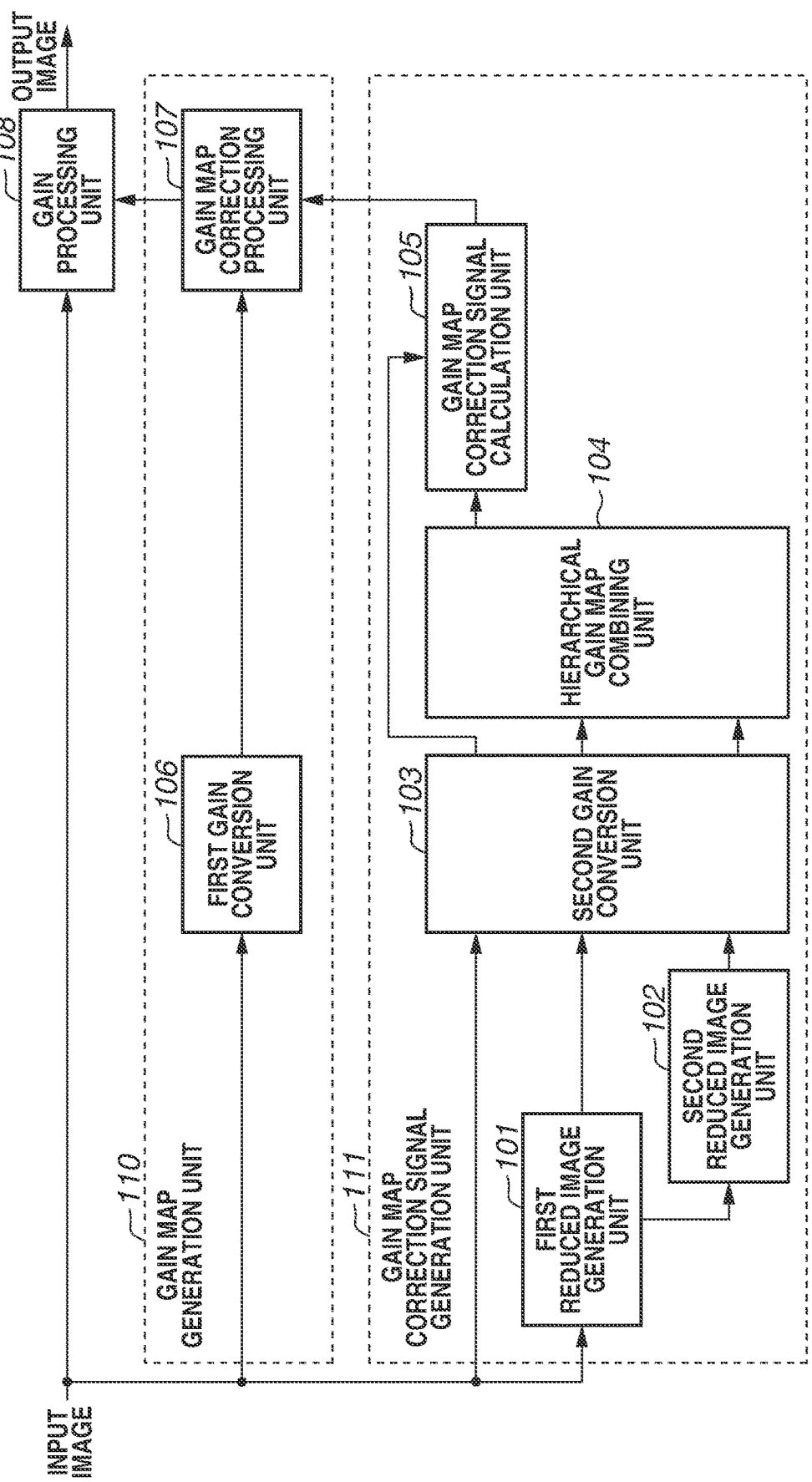
FIG. 1 is a functional block diagram illustrating a schematic configuration of an image processing apparatus according to one or more aspects of the present disclosure.

FIG. 1 is a functional block diagram illustrating a schematic configuration of the image processing apparatus according to one or more aspects of the present disclosure.

The image processing apparatus according to one or more aspects of the present disclosure may be an apparatus that performs gain processing on an input image by applying a gain map as gain information including gain values corresponding to respective pixels, and outputs the image subjected to the gain processing. As illustrated in FIG. 1, the image processing apparatus according to the present exemplary embodiment includes a gain processing unit 108, a gain map generation unit 110, and a gain map correction signal generation unit 111. Assume that an input image to be input to the image processing apparatus according to the present exemplary embodiment includes a luminance signal generated from a captured image and an output image to be output from the image processing apparatus also includes a luminance signal. Configurations for various signal processing operations, such as acquisition of a captured image and development processing on an image pickup signal, and descriptions thereof are omitted.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

The gain map generation unit 110 generates a reference gain map as reference gain information based on the input image, and corrects the reference gain map by a gain map correction signal generated by the gain map correction signal generation unit 111, thereby generating a final gain map. The detailed configuration and operation of the gain map generation unit 110 will be described below.

The gain processing unit 108 performs gain processing on the input image by using the final gain map generated by the gain map generation unit 110. The detailed configuration and operation of the gain processing unit 108 will be described below.

The gain map correction signal generation unit 111 generates the gain map correction signal for correcting the reference gain map generated by the gain map generation unit 110. In the present exemplary embodiment, the gain map correction signal generation unit 111 converts a first tone characteristic, which is to be originally applied to the input image, into a second tone characteristic in that the gain value monotonically decreases or monotonically increases in a uniform manner regardless of a luminance range. The first exemplary embodiment illustrates an example of the second tone characteristic in that the gain value monotonically decreases in a uniform manner. An example of the second tone characteristic in that the gain value monotonically increases in a uniform manner will be described in a second exemplary embodiment below. The gain map correction signal generation unit 111 generates gain maps using the input image and a plurality of images obtained by performing reduction processing or filter processing on the input image based on the second tone characteristic, and generates the gain map correction signal based on the gain maps. The detailed configuration and operation of the gain map correction signal generation unit 111 will be described below.

Figure 5A:
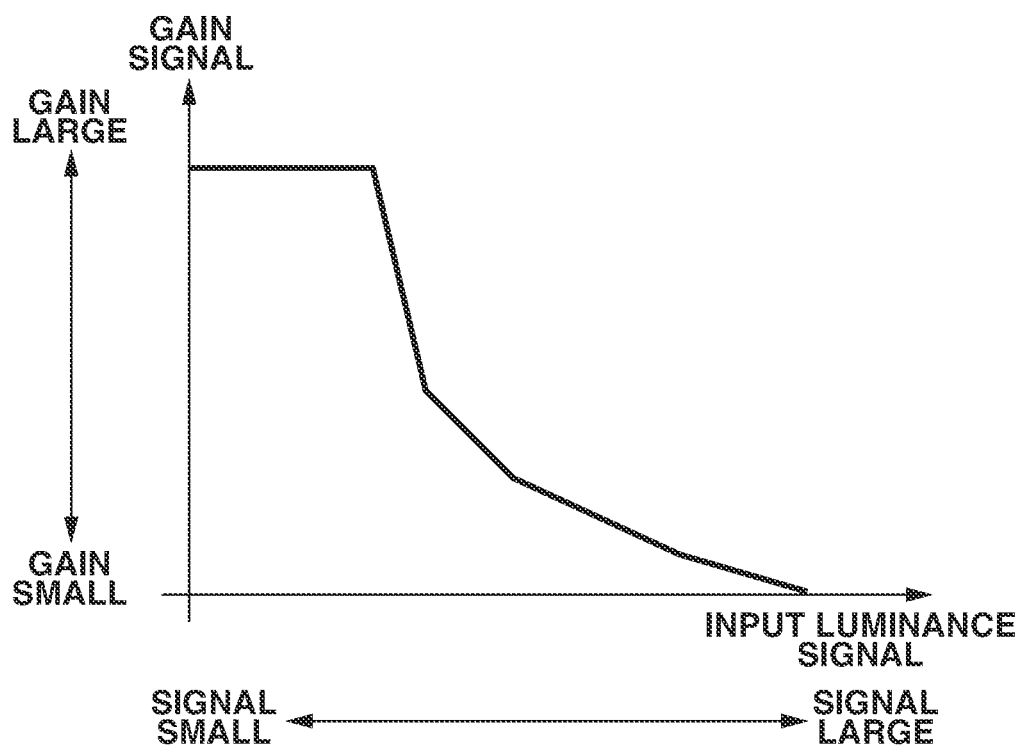
FIG. 5A is a graph illustrating a tone characteristic.
Figure 5B:
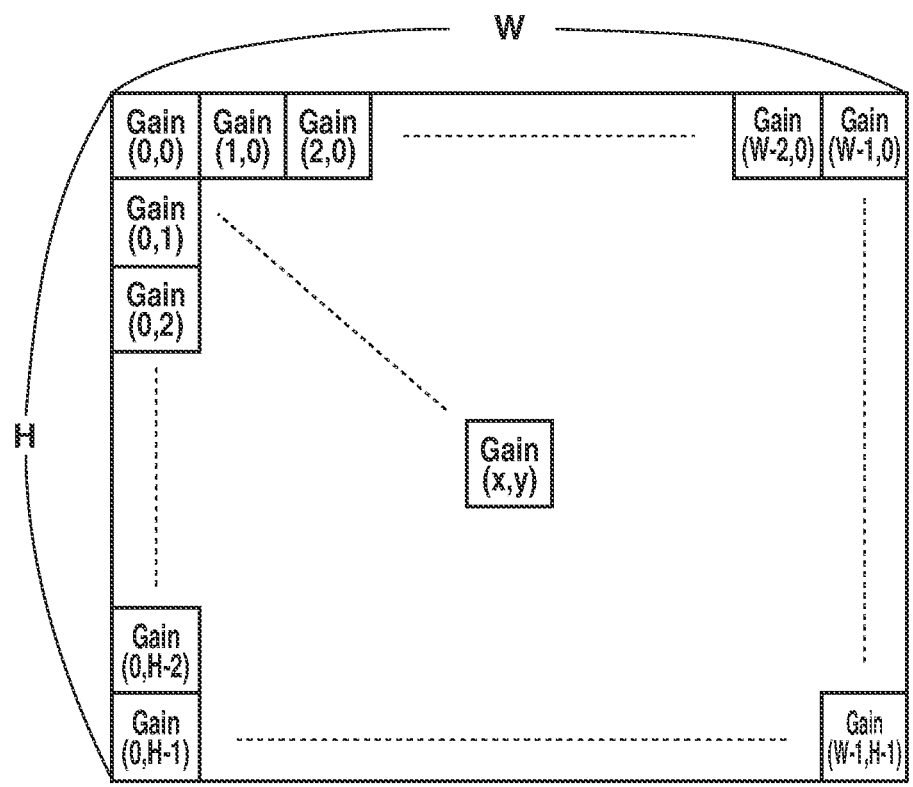
FIG. 5B illustrates a gain map according to one or more aspects of the present disclosure.

The tone characteristic according to the present exemplary embodiment is, for example, a gain characteristic represented by a table (graph) as illustrated in FIG. 5A in which a horizontal axis represents the luminance signal (luminance value) of the input image and a vertical axis represents a gain signal (gain value). A gain map is generated by obtaining gain values corresponding to luminance values for respective pixels of the input image using the table (graph) as illustrated in FIG. 5A. Specifically, the gain map is a map in which gain values are arranged so as to correspond to respective pixel positions as illustrated in FIG. 5B. The gain map illustrated as an example in FIG. 5B is a map in which gain values Gain(x, y) to be applied to the positions of coordinates (x, y) of respective pixels are two-dimensionally arranged when an image is represented by, for example, H pixels×W pixels. In the example illustrated in FIG. 5B, "x" in the coordinates (x, y) is one of 0, 1, 2, ..., and W−1, and "y" is one of 0, 1, 2, ..., and H−1.

Prior to the description of the detailed configuration and operation of the image processing apparatus according to one or more aspects of the present disclosure, an outline of tone processing performed in general local tone mapping processing and problems with the tone processing will now be discussed. FIG. 7A is a graph in which the luminance signal (luminance value) of a certain input image is plotted in an x-direction (x-coordinate direction). In FIG. 7A, the horizontal axis represents a position in the x-direction and the vertical axis represents a luminance value. A solid line 701 illustrated in FIG. 7A represents the luminance signal of the input image. In other words, the luminance signal illustrated as an example in FIG. 7A is a luminance signal having an edge portion at which the luminance value rapidly changes at a certain position in the x-direction. A broken line 702 illustrated in FIG. 7A represents a luminance signal of a low-frequency image generated by performing reduction processing, filter processing, or other processes on the input image. Since the luminance signal of the low-frequency image is a signal obtained by performing reduction processing, filter processing, or other processes on the input image, the luminance signal of the low-frequency image is a signal having a luminance value that slowly changes as indicated by the broken line 702 illustrated in FIG. 7B at an edge portion of the input image.

FIG. 7B is a graph in which a gain value in the gain map generated based on the luminance signal of the low-frequency image indicated by the broken line 702 illustrated in FIG. 7A is plotted in the x-direction using, for example, the tone characteristic in that the gain value monotonically decrease with respect to the luminance. In FIG. 7B, the horizontal axis represents a position in the x-direction and the vertical axis represents a gain value. Specifically, when the tone characteristic in that the gain value monotonically decreases with respect to the luminance are used, the gain map generated from the luminance signal of the low-frequency image as indicated by the broken line 702 illustrated in FIG. 7A includes a characteristic in that the gain value slowly changes as indicated by a broken line 703 illustrated in FIG. 7B.

In this case, it is important that the value of the luminance signal of the input image, indicated by the solid line 701 illustrated in FIG. 7A, rapidly decreases from left to right in the x-direction, while the gain value slowly increases from left to right in the gain map as indicated by the broken line 703 illustrated in FIG. 7B. When gain processing is performed on the luminance signal of the input image, indicated by the solid line 701 illustrated in FIG. 7A, using the gain map indicating the characteristic as indicated by the broken line 703 illustrated in FIG. 7B, the luminance signal obtained after the gain processing is performed becomes a signal as indicated by a sold line 704 illustrated in FIG. 7C. FIG. 7C illustrates the luminance signal of the input image obtained after the gain processing is performed. In FIG. 7C, the horizontal axis represents a position in the x-direction and the vertical axis represents the luminance signal. Specifically, when gain processing is performed on the luminance signal (solid line 701) of the input image illustrated in FIG. 7A using the gain map illustrated in FIG. 7B, a signal portion within a range 705 indicated by arrows in FIG. 7C is enhanced to thereby obtain the luminance signal (solid line 704) with an improved contrast.

On the other hand, for example, in the case of using a tone characteristic in that the gain value monotonically increases with respect to the luminance, the effect of improving the contrast as illustrated in FIGS. 7A to 7C cannot be obtained in general local tone mapping processing.

FIG. 7D illustrates the luminance signal (solid line 701) of the input image and the luminance signal (broken line 702) of the low-frequency image which are similar to those illustrated in FIG. 7A. FIG. 7E is a graph in which a gain value in the gain map generated based on the luminance signal of the low-frequency image indicated by the broken line 702 illustrated in FIG. 7D is plotted in the x-direction using, for example, a tone characteristic in that the gain value monotonically increases with respect to the luminance. In FIG. 7E, the horizontal axis represents a position in the x-direction and the vertical axis represents a gain value. Specifically, in the case of using the tone characteristic in that the gain value monotonically increases with respect to the luminance, the gain map generated from the luminance signal of the low-frequency image as indicated by the broken line 702 illustrated in FIG. 7D includes a characteristic in that the gain value changes as indicated by a broken line 706 illustrated in FIG. 7E.

The gain map illustrated in FIG. 7B shows a characteristic in that the gain value slowly increases from left to right in the x-direction, while the gain map illustrated in FIG. 7E shows a characteristic in that the gain value slowly decreases from left to right in the x-direction. Accordingly, when gain processing is performed on the luminance signal of the input image, indicated by the solid line 701 illustrated in FIG. 7D, using the gain map including the characteristic as indicated by the broken line 706 illustrated in FIG. 7E, the luminance signal obtained after the gain processing becomes a signal as indicated by a solid line 707 illustrated in FIG. 7F. FIG. 7F illustrates the luminance signal of the input image obtained after the gain processing. In FIG. 7F, the horizontal axis represents a position in the x-direction and the vertical axis represents the luminance signal, like in FIG. 7C. Specifically, when gain processing is performed on the luminance signal of the input image illustrated in FIG. 7D using the gain map illustrated in FIG. 7E, the luminance value of a signal portion within a range 708 indicated by arrows in FIG. 7F slowly decreases, so that the luminance signal with a reduced contrast is obtained.

Thus, in general tone mapping using a gain map generated from a low-frequency image, when the tone characteristic used for generating the gain map is a characteristic in that the gain value monotonically increases with respect to the luminance, the contrast may be reduced due to the gain processing. Although FIGS. 7A to 7F illustrate examples in which the luminance signal of the input image decreases from left to right in the x-direction, the contrast may be reduced also when the luminance signal of the input image increases from right to left in the x-direction. Specifically, for example, in a case where the luminance signal of the input image increases from left to right in the x-direction, and in a case where the tone characteristic used for generating the gain map is a characteristic in that the gain value monotonically decreases with respect to the luminance, the contrast of an image may be reduced due to the gain processing.

Figure 2:
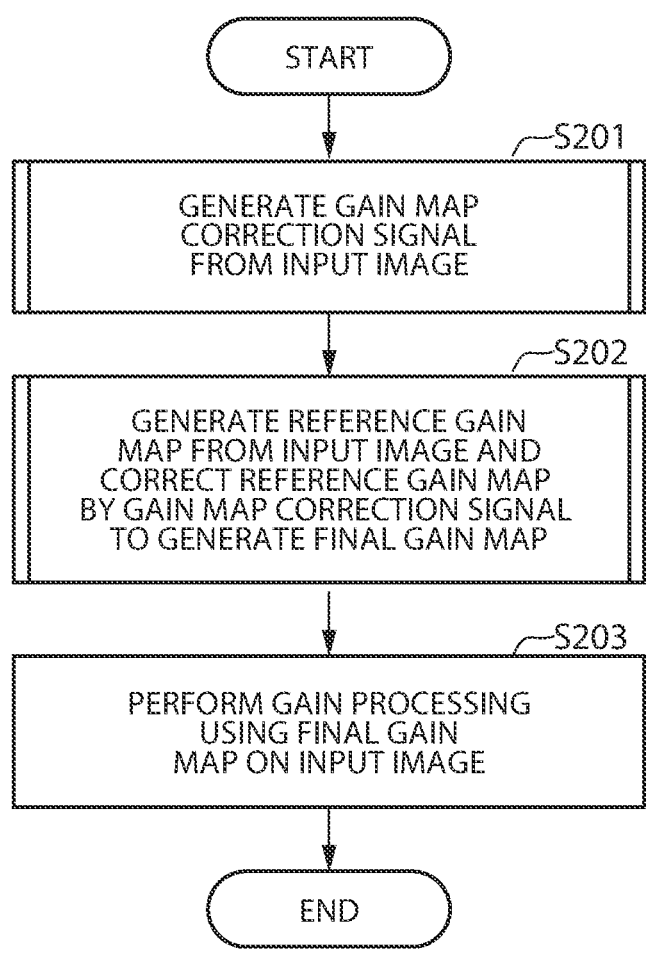
FIG. 2 is a flowchart illustrating a processing flow of an image processing apparatus according to one or more aspects of the present disclosure.
Figure 3:
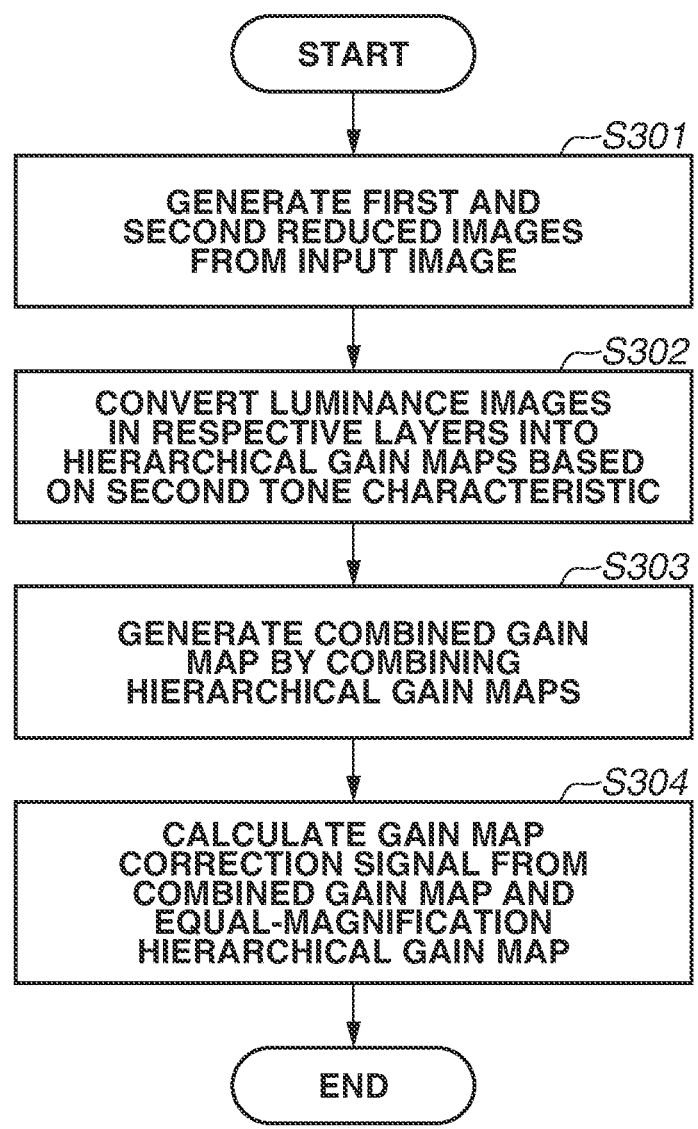
FIG. 3 is a flowchart illustrating a gain map correction signal generation processing flow according to one or more aspects of the present disclosure.
Figure 4:
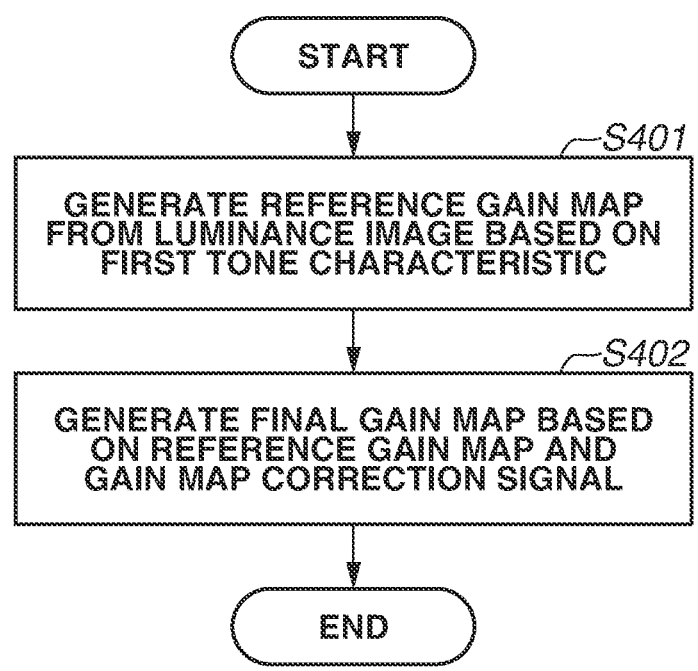
FIG. 4 is a flowchart illustrating a final gain map generation processing flow according to one or more aspects of the present disclosure.

Accordingly, the image processing apparatus according to one or more aspects of the present disclosure may have the configuration illustrated in FIG. 1 and may perform processing in flowcharts of FIGS. 2 to 4 to thereby improve the contrast of an image when the characteristic in that the gain value monotonically increases or the characteristic in that the gain value monotonically decreases is used as the tone characteristic for generating the gain map.

FIG. 2 is a flowchart illustrating an image processing flow of the image processing apparatus according to one or more aspects of the present disclosure illustrated in FIG. 1. In the following description, steps S201 to S203 in the flowchart of FIG. 2 are simply expressed by S201 to S203, respectively. The same applies to the other flowcharts described below. Processes illustrated in the flowcharts may be implemented in such a manner that, for example, an image processing program according to one or more aspects of the present disclosure may be executed by a CPU or other units, or some or all of the processes may be implemented by hardware such as an electronic circuit.

In S201 of the flowchart illustrated in FIG. 2, the gain map correction signal generation unit 111 performs processing for generating the gain map correction signal for correcting the reference gain map from the input image. The gain map correction signal generation processing in S201 will be described in detail below.

Next, in S202, the gain map generation unit 110 generates the reference gain map based on the input image. Further, the gain map generation unit 110 generates the final gain map by correcting the reference gain map by the gain map correction signal generated by the gain map correction signal generation unit 111 in S201. The reference gain map generation processing, the reference gain map correction processing, and the final gain map generation processing in S202 will be described in detail below.

Next, in S203, the gain processing unit 108 performs gain processing on the input image using the final gain map generated by the gain map generation unit 110 in S202. For example, assuming that the luminance value in the coordinates (x, y) of the input image is represented by in(x, y) and the gain value corresponding to the same coordinates (x, y) in the final gain map generated by the gain map generation unit 110 is represented by Gain(x, y), an output luminance value out(x, y) which is obtained after the gain processing is performed is expressed by Formula (1).

$$\text{out}(x,y) = \text{Gain}(x,y) \times \text{in}(x,y) \qquad \text{Formula (1)}$$

The outline of the image processing flow of the image processing apparatus according to one or more aspects of the present disclosure has been described above. The gain map correction signal generated in S201 of FIG. 2 and the reference gain map generation processing of S202 in FIG. 2 will be described below. FIG. 3 is a flowchart illustrating detail processing in S201 of FIG. 2, and FIG. 4 illustrates a detailed flowchart of S202 illustrated in FIG. 2.

Referring first to the flowchart of FIG. 3, the gain map correction signal generation processing performed by the gain map correction signal generation unit 111 illustrated in FIG. 1 will be described. The gain map correction signal generation unit 111 illustrated in FIG. 1 includes a first reduced image generation unit 101, a second reduced image generation unit 102, a second gain conversion unit 103, a hierarchical gain map combining unit 104, and a gain map correction signal calculation unit 105.

In S301 of FIG. 3, the first reduced image generation unit 101 generates a first reduced image by performing reduction processing on the input image, and the second reduced image generation unit 102 generates a second reduced image by performing further reduction processing on the first reduced image. Thus, the first reduced image is generated by performing reduction processing on the input image, and the second reduced image is generated by performing further reduction processing on the first reduced image. Accordingly, the first reduced image and the second reduced image are low-frequency images having different image sizes and different frequency levels. As a reduction processing method, a publicly-known method, such as reduction processing using a bilinear method, is used.

Next, in S302, the second gain conversion unit 103 generates a first tone characteristic based on the input image, and further generates a second tone characteristic based on the first tone characteristic. The second gain conversion unit 103 applies the second tone characteristic to the input image to thereby generate a gain map (hereinafter referred to as an equal-magnification hierarchical gain map). The second gain conversion unit 103 applies the second tone characteristic to the first reduced image generated by the first reduced image generation unit 101, to thereby generate a gain map (hereinafter referred to as a first hierarchical gain map). Similarly, the second gain conversion unit 103 applies the second tone characteristic to the second reduced image generated by the second reduced image generation unit 102, to thereby generate a gain map (hereinafter referred to as a second hierarchical gain map).

Figure 6A:
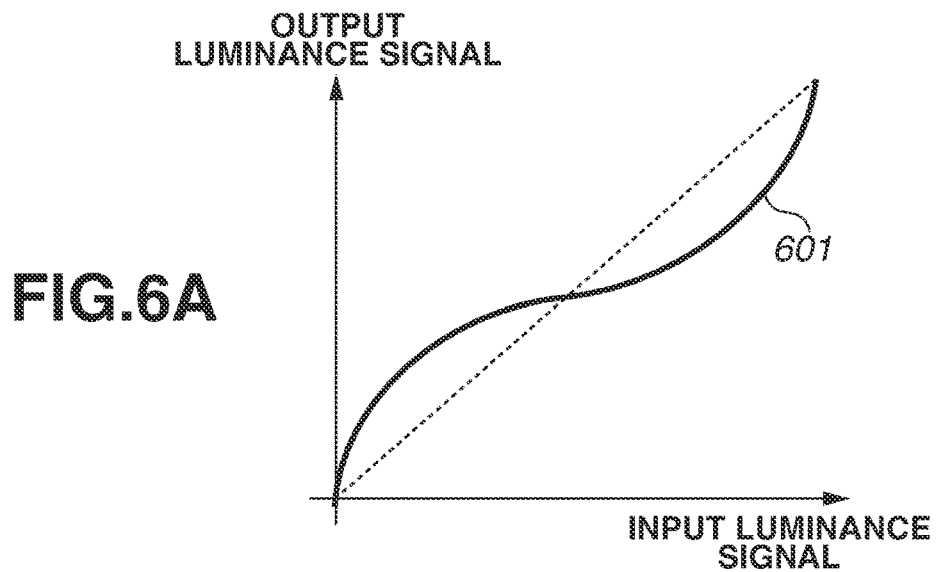
FIGS. 6A, 6B, and 6C are graphs each illustrating first and second tone characteristics according to one or more aspects of the present disclosure.
Figure 6B:
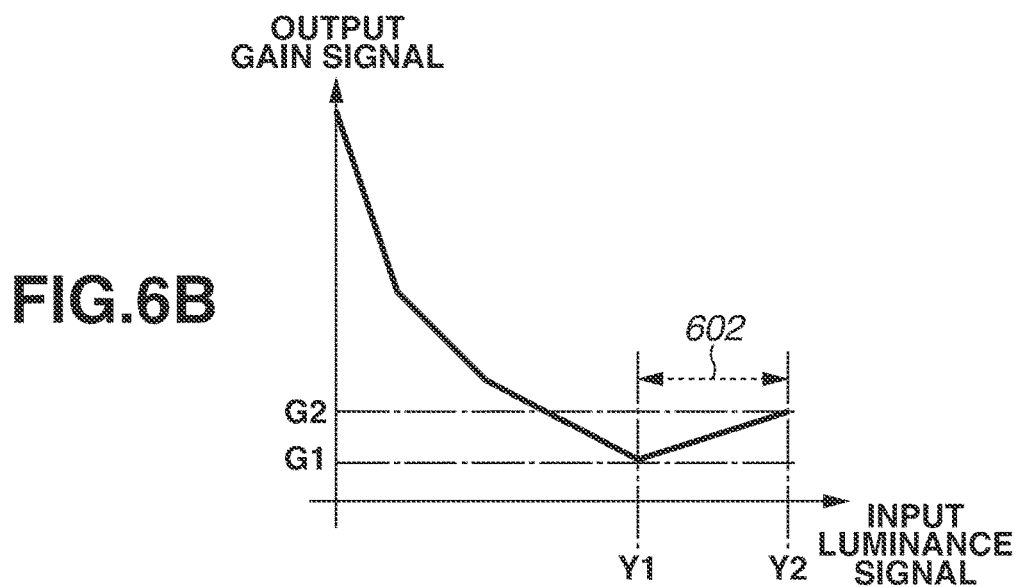
Figure 6C:
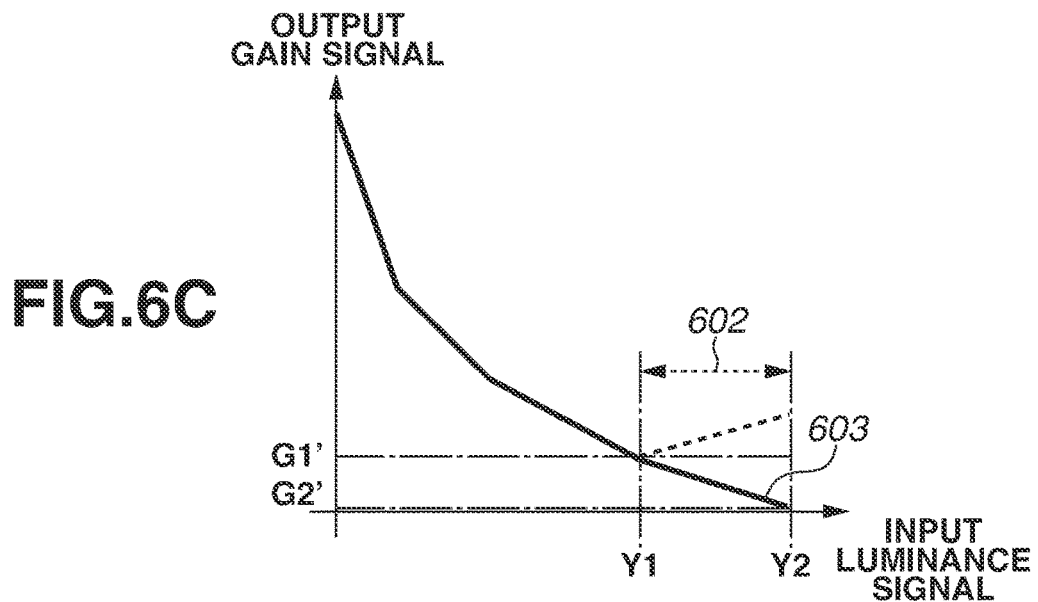

Assume herein that the tone characteristic applied in tone processing in which an input luminance signal and an output luminance signal have a relationship as illustrated in FIG. 6A correspond to the first tone characteristic illustrated in, for example, FIG. 6B. In FIG. 6B, the horizontal axis represents an input luminance signal (luminance value) and the vertical axis represents a gain signal (gain value) output according to the luminance value. Specifically, in the present exemplary embodiment, the first tone characteristic to be applied in tone processing on the input image include a characteristic in that the gain value monotonically increases or monotonically decreases according to the luminance range of the input image, in other words, a characteristic including a luminance range where the luminance value monotonically increases. On the other hand, the second tone characteristic according to the first exemplary embodiment is a characteristic in that the gain value monotonically decreases in a uniform manner regardless of the luminance range as illustrated in FIG. 6C. In FIG. 6C, the horizontal axis represents the luminance value of the input image and the vertical axis represents the gain value output according to the luminance value, like in FIG. 6B. Specifically, the second tone characteristic is a characteristic in that, as illustrated in FIG. 6C, a characteristic portion of the first tone characteristic that monotonically increases in a luminance range 602 illustrated in FIG. 6B is converted into a characteristic portion that monotonically decreases as indicated by a characteristic 603.

When the first tone characteristic to be applied to the luminance range 602 between luminance values Y1 and Y2 is expressed by Formula (2), the second tone characteristic to be applied to the luminance range 602 in the first exemplary embodiment can be expressed by Formula (3). In Formulas (2) and (3), "X" represents an input luminance value, and "a" represents a gradient. In Formula (2), Gain represents a gain value of the first tone characteristic to be applied in the tone processing. In Formula (3), Gain' represents a gain value of the second tone characteristic. In Formula (2), G1 represents the gain value when the input luminance value is Y1. In Formula (3), G1' represents the gain value when the input luminance value is Y1.

$$\text{Gain} = a(X - Y1) + G1 \quad \text{Formula (2)}$$

$$\text{Gain}' = -a(X - Y1) + G1' \quad \text{Formula (3)}$$

As represented by Formulas (2) and (3), in the case of converting the tone characteristic from the first tone characteristic to the second tone characteristic, the sign of the gradient of a characteristic portion that monotonically increases in the luminance range 602 illustrated in FIG. 6B is inverted, and the characteristic portion is connected to the first tone characteristic at the portion corresponding to the luminance value Y1. Thus, as illustrated in FIG. 6C, the second tone characteristic in that the gain value monotonically decreases in a uniform manner regardless of the luminance range is generated.

Figure 8A:
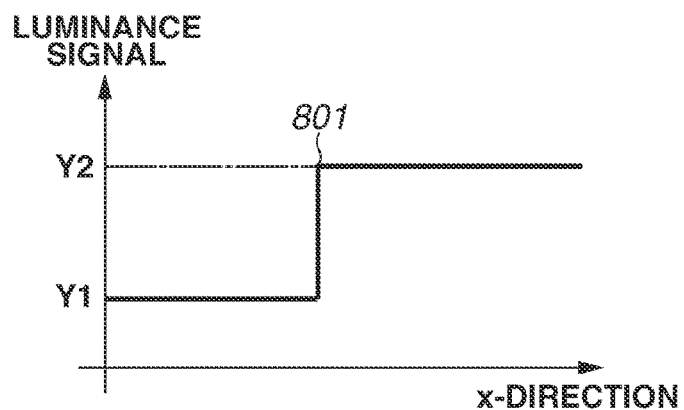
FIGS. 8A, 8B, 8C, 8D, and 8E are graphs each illustrating an example where a contrast is improved according to according to one or more aspects of the present disclosure.

FIG. 8A is a graph in which the luminance signal (luminance value) of the input image (i.e., the input image that is not subjected to reduction processing) is plotted in the x-direction (x-coordinate direction). In FIG. 8A, the horizontal axis represents a position in the x-direction and the vertical axis represents a luminance value. A solid line 801 illustrated in FIG. 8A represents the luminance signal of the input image. Specifically, the luminance signal illustrated as an example in FIG. 8A is a luminance signal having an edge portion at which the luminance value at a certain position in the x-direction increases from Y1 to Y2. Although not illustrated in FIG. 8A, the luminance signals of the first and second reduced images that are low-frequency images are luminance signals each having a luminance value that slowly increases from left to right in the x-direction at the edge portion where the luminance value of the luminance signal of the input image increases from Y1 to Y2. That is, since the first and second reduced images are low-frequency images obtained by performing reduction processing on the input image, the luminance signals of the first and second reduced image are signals each having a luminance value that slowly changes (slowly increases from left to right in the x-direction) in a certain degree of range including an edge portion of the input image.

Figure 8B:
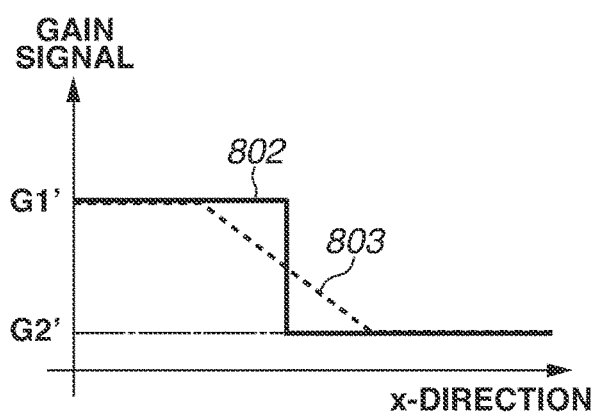

FIG. 8B is a graph in which a gain value in the gain map generated based on the luminance signal illustrated in FIG. 8A is plotted in the x-direction by using the second tone characteristic illustrated in FIG. 6C. A solid line 802 illustrated in FIG. 8B represents each gain value in the equal-magnification hierarchical gain map generated based on the luminance signal indicated by the solid line 801 illustrated in FIG. 8A, that is, the luminance signal of the input image that is not subjected to reduction processing, by using the second tone characteristic. Specifically, the equal-magnification hierarchical gain map includes a gain characteristic in that the gain value corresponding to a portion where the luminance value increases from Y1 to Y2 in the solid line 801 illustrated in FIG. 8A decreases from G1' to G2' as indicated by the solid line 802 illustrated in FIG. 8B. The gain value G2' is the gain value corresponding to the input luminance value Y2.

On the other hand, a broken line 803 illustrated in FIG. 8B represents each gain value in the gain map generated from the flow-frequency image by using the second tone characteristic. The gain map indicated by the broken line 803 illustrated in FIG. 8B represents a combined gain map obtained by combining the first hierarchical gain map generated from the first reduced image and the second hierarchical gain map generated from the second reduced image by the subsequent-stage hierarchical gain map combining unit 104. In other words, the combined gain map, which is generated based on the first and second reduced images that are low-frequency images, includes a gain characteristic in that the gain value slowly decreases from G1' to G2' as indicated by the broken line 803 illustrated in FIG. 8B.

Thus, in the present exemplary embodiment, the second gain conversion unit 103 generates the equal-magnification hierarchical gain map, the first hierarchical gain map, and the second hierarchical gain map by applying the second tone characteristic to each of the input image, the first reduced image, and the second reduced image described above.

Referring again to the flowchart of FIG. 3, the description of the flowchart is continued. In S303, the hierarchical gain map combining unit 104 combines the first hierarchical gain map with the second hierarchical gain map, to thereby generate the combined gain map. In the case of combining the hierarchical gain maps, the second hierarchical gain map is enlarged to a size corresponding to the first hierarchical gain map. As a method for generating the combined gain map, a publicly-known method is used in which weighted addition is performed on a gain signal in a gain map having a large image size and a gain signal in a gain map having a small image size according to a difference between the gain signals. As an example of publicly-known methods for performing weighted addition according to the difference between the gain signals, a technique discussed in Japanese Patent Application Laid-Open No. 2014-154108 can be used, which is incorporated by reference herein. In the example illustrated in FIG. 8B described above, the gain map obtained by combining the first hierarchical gain map with the second hierarchical gain map includes the characteristic as indicated by the broken line 803.

Next, in S304, the gain map correction signal calculation unit 105 generates the gain map correction signal based on the combined gain map generated by the hierarchical gain map combining unit 104 and the equal-magnification hierarchical gain map generated by the second gain conversion unit 103. Assuming that, in the coordinates (x, y), the gain value in the combined gain map is represented by compG(x, y) and the gain value in the equal-magnification hierarchical gain map is represented by orgG(x, y), a gain map correction signal subG(x, y) is expressed by Formula (4).

$$\text{sub}G(x,y) = \text{comp}G(x,y) - \text{org}G(x,y) \quad \text{Formula (4)}$$

Figure 8D:
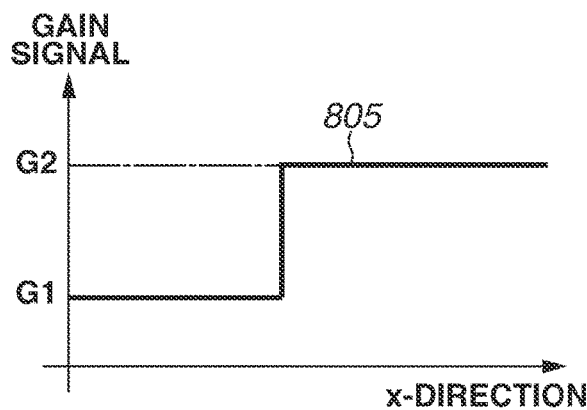
Figure 8C:
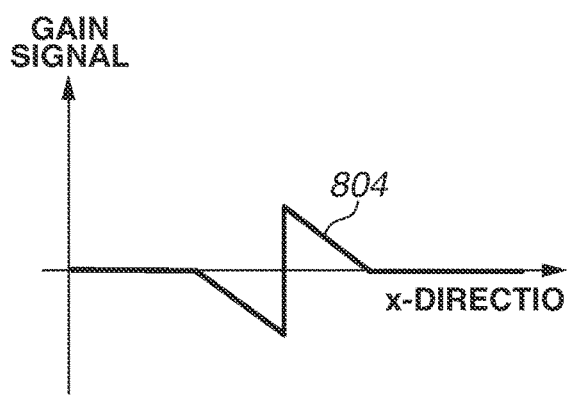

In the example illustrated in FIG. 8B described above, the gain map correction signal subG(x, y) becomes a signal as indicated by a solid line 804 illustrated in FIG. 8C. In FIG. 8C, the horizontal axis represents a position in the x-direction and the vertical axis represents a gain value. As represented by Formula (4), the gain map correction signal subG(x, y) is generated by subtracting a gain value orgG(x, y) in the equal-magnification hierarchical gain map from a gain value compG(x, y) in the combined gain map. Since the gain map correction signal is generated by subtracting the gain value indicated by the solid line 802 illustrated in FIG. 8B from the gain value indicated by the broken line 803 illustrated in FIG. 8B in the coordinates (x, y), the gain map correction signal becomes a signal as indicated by the solid line 804 illustrated in FIG. 8C.

In the exemplary embodiment described above, the gain map correction signal is generated based on the difference value obtained by subtracting a gain value in the equal-magnification hierarchical gain map from a gain value in the combined gain map. In addition, the gain map correction signal may be generated based on an adjusted value obtained by, for example, multiplying the difference value by an adjustment coefficient k as represented by Formula (5). The value of the adjustment coefficient k may be changed according to the value in the combined gain map or the equal-magnification hierarchical gain map.

$$\text{sub}G(x,y) = k(\text{comp}G(x,y) - \text{org}G(x,y)) \quad \text{Formula (5)}$$

Next, the final gain map generation processing performed by the gain map generation unit 110 illustrated in FIG. 1 will be described with reference to the flowchart of FIG. 4. The gain map generation unit 110 illustrated in FIG. 1 includes a first gain conversion unit 106 and a gain map correction processing unit 107.

In S401 of FIG. 4, the first gain conversion unit 106 generates the reference gain map by applying the first tone characteristic to the input image. As described above, the first tone characteristic is a tone characteristic to be applied to the input image in the tone processing, and is a characteristic in that the gain value monotonically increases or monotonically decreases according to the luminance range as illustrated in FIG. 6B. Specifically, the first gain conversion unit 106 generates the reference gain map from the input image by applying the first tone characteristic illustrated in FIG. 6B to the input image, i.e., by directly applying the first tone characteristic including the characteristic portion that monotonically increases in the luminance range 602 illustrated in FIG. 6B.

FIG. 8D is a graph in which a gain value in the gain map generated based on the luminance signal illustrated in FIG. 8A is plotted in the x-direction by using the first tone characteristic illustrated in FIG. 6B. A solid line 805 illustrated in FIG. 8D represents each gain value in the reference gain map generated based on the luminance signal (luminance signal of the input image that is not subjected to reduction processing) indicated by the solid line 801 illustrated in FIG. 8A by using the first tone characteristic. Specifically, the reference gain map includes a gain characteristic in that the gain value corresponding to the portion where the luminance value increases from Y1 to Y2 in the solid line 801 illustrated in FIG. 8A increases from G1 to G2 as indicated by the solid line 805 illustrated in FIG. 8D. The gain value G1 is the gain value corresponding to the input luminance value Y1, and the gain value G2 is the gain value corresponding to the input luminance value Y2. Thus, the first gain conversion unit 106 generates the reference gain map including the characteristic as illustrated in FIG. 8D based on the luminance signal as indicated by the solid line 801 illustrated in FIG. 8A by using the first tone characteristic.

Next, in S402, the gain map correction processing unit 107 corrects the reference gain map, which is generated by the first gain conversion unit 106, by the gain map correction signal generated by the gain map correction signal generation unit 111, to thereby generate the final gain map. Assuming herein that, in the coordinates (x, y), the gain value in the reference gain map generated based on the first tone characteristic is represented by org2G(x, y) and the value of the gain map correction signal is represented by subG(x, y), the gain value Gain(x, y) in the final gain map can be calculated by Formula (6).

$$\text{Gain}(x,y) = \text{sub}G(x,y) + \text{org}2G(x,y) \quad \text{Formula (6)}$$

Figure 8E:
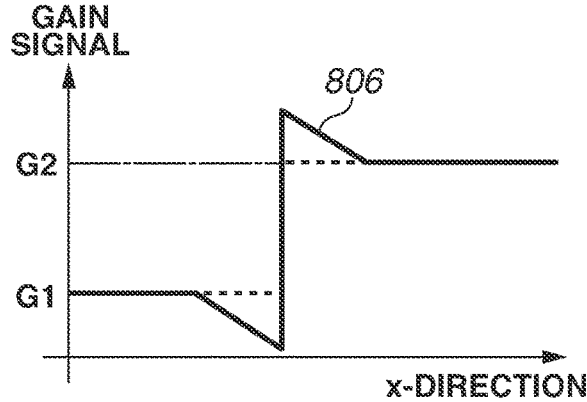

FIG. 8E is a graph illustrating the gain signal of the final gain map. In FIG. 8E, the horizontal axis represents a position in the x-direction and the vertical axis represents the value of the gain signal. The gain signal Gain(x, y) of the final gain map is generated by adding the gain signal org2G(x, y) of the reference gain map and the gain map correction signal subG(x, y) by Formula (6). Specifically, the final gain map is a gain map as indicated by a solid line 806 illustrated in FIG. 8E in which the value of the gain map correction signal indicated by the solid line 804 illustrated in FIG. 8C and the gain value in the reference gain map indicated by the solid line 805 illustrated in FIG. 8D are added. The final gain map is a gain map in which a contrast can be made as illustrated in FIG. 8E also in the luminance range 602 that monotonically increases in FIG. 6B as described above.

The gain map correction processing unit 107 sends the final gain map to the gain processing unit 108 illustrated in FIG. 1, and the gain processing unit 108 performs the gain processing in which the final gain map is applied.

Therefore, according to the present exemplary embodiment, the contrast of an image can be improved in either case where the tone characteristic that monotonically increases is set or the tone characteristic that monotonically decreases is set in the tone processing.

Figure 9A:
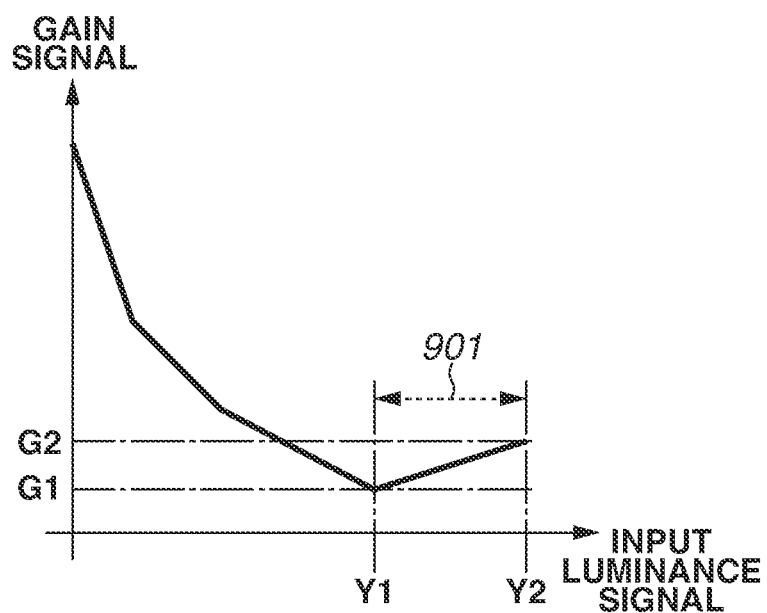
FIGS. 9A and 9B are graphs each illustrating a second tone characteristic according to according to one or more aspects of the present disclosure.
Figure 9B:
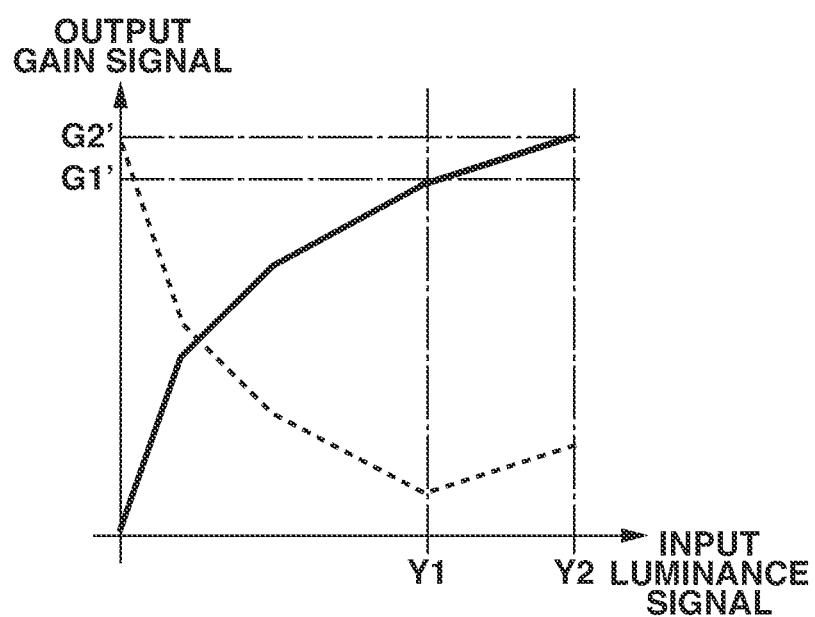

A second exemplary embodiment will be described below. The configuration and basic processing of an image processing apparatus according to the second exemplary embodiment are respectively similar to the configuration illustrated in FIG. 1 and the processing in the flowcharts of FIGS. 2 to 4, and thus descriptions thereof are omitted. Only differences between the first exemplary embodiment and the second exemplary embodiment will be described below. The first exemplary embodiment described above illustrates an example where the second tone characteristic that the gain value monotonically decreases in a uniform manner regardless of the luminance range as illustrated in FIG. 6C is used. On the other hand, the second exemplary embodiment illustrates an example where the second tone characteristic is a characteristic in that the gain value monotonically increases in a uniform manner regardless of the luminance range as illustrated in FIG. 9B. FIG. 9A is a graph illustrating the first tone characteristic which is similar to that illustrated in FIG. 6B described above and is a characteristic in that the gain value monotonically increases in a luminance range 901 of the luminance values Y1 to Y2.

In the second exemplary embodiment, in the case of converting the tone characteristic from the first tone characteristic to the second tone characteristic, the sign of the characteristic in the entire luminance range of the first tone characteristic illustrated in FIG. 9A is first inverted. In this case, the sign-inverted first tone characteristic is a characteristic that, in the luminance range 901 between the luminance values Y1 and Y2 illustrated in FIG. 9A, monotonically decreases. Accordingly, the sign of the gradient of the portion that monotonically decreases (the portion corresponding to the luminance range 901 illustrated in FIG. 9A) in the sign-inverted first tone characteristic is further inverted and the portion is connected to the first tone characteristic at the portion corresponding to the luminance value Y1. As a result, the second tone characteristic in that the gain value monotonically increases in a uniform manner is generated regardless of the luminance range.

Figure 10A:
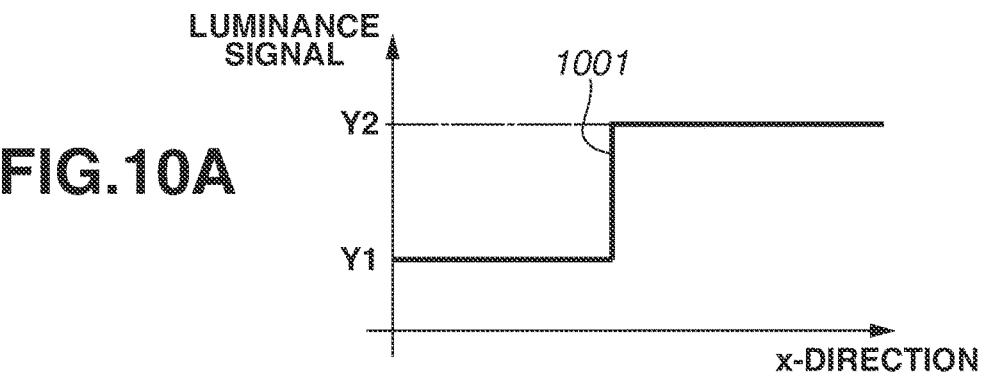
FIGS. 10A, 10B, 10C, 10D, 10E, and 10F are graphs each illustrating an example where a contrast is improved according to according to one or more aspects of the present disclosure.
Figure 10B:
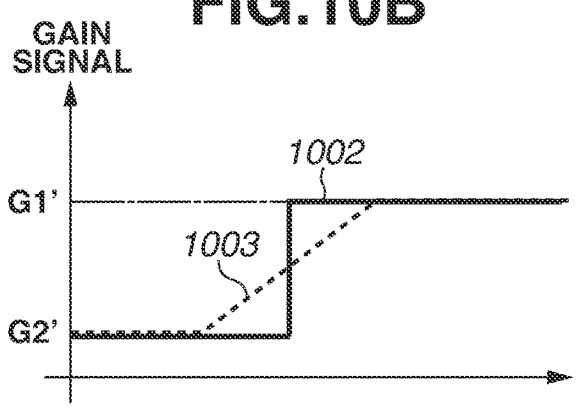

Similarly to FIG. 8A described above, FIG. 10A is a graph in which the luminance value of the input image is plotted in the x-direction. A solid line 1001 illustrated in FIG. 10A represents the luminance signal of the input image. Similarly to FIG. 8A described above, although not illustrated in FIG. 10A, the luminance signals of the first and second reduced images are luminance signals each having a luminance value that slowly increases from left to right in the x-direction. FIG. 10B is a graph in which a gain value in the gain map generated based on the luminance signal illustrated in FIG. 10A is plotted in the x-direction by using the second tone characteristic illustrated in FIG. 9B in the hierarchical gain map combining unit 104. A solid line 1002 illustrated in FIG. 10B represents each gain value in the equal-magnification hierarchical gain map generated based on the luminance signal of the input image as indicated by the solid line 1001 illustrated in FIG. 10A by using the second tone characteristic. In the second exemplary embodiment, the equal-magnification hierarchical gain map includes a gain characteristic in that the gain value corresponding to the portion where the luminance value increases from Y1 to Y2 in the solid line 1001 illustrated in FIG. 10A increases from G1' to G2' as indicated by the solid line 1002 illustrated in FIG. 10B.

On the other hand, a broken line 1003 illustrated in FIG. 10B represents each gain value in the gain map generated from the low-frequency image by using the second tone characteristic. Similarly to the example illustrated in FIG. 8B, the gain map indicated by the broken line 1003 illustrated in FIG. 10B represents the combined gain map obtained by combining the first hierarchical gain map with the second hierarchical gain map. Further, in the second exemplary embodiment, the gain map correction signal calculation unit 105 generates a signal as indicated by a solid line 1004 illustrated in FIG. 10C by subtracting the equal-magnification hierarchical gain map indicated by the solid line 1002 from the combined gain map indicated by the broken line 1003 illustrated in FIG. 10B. Furthermore, in the second exemplary embodiment, the gain map correction signal calculation unit 105 calculates, as the gain map correction signal, a signal obtained by inverting the sign of the signal indicated by the solid line 1004 illustrated in FIG. 10C. Accordingly, in the second exemplary embodiment, the gain map correction signal becomes a signal as indicated by a solid line 1005 illustrated in FIG. 10D.

Similarly to FIG. 8D described above, FIG. 10E is a graph in which a gain value in the reference gain map generated based on the luminance signal illustrated in FIG. 10A is plotted in the x-direction by using the first tone characteristic. Specifically, the solid line 1005 illustrated in FIG. 10E represents each gain value in the reference gain map generated by the first gain conversion unit 106 based on the luminance signal of the input image indicated by the solid line 1001 illustrated in FIG. 10A by using the first tone characteristic.

Figure 10E:
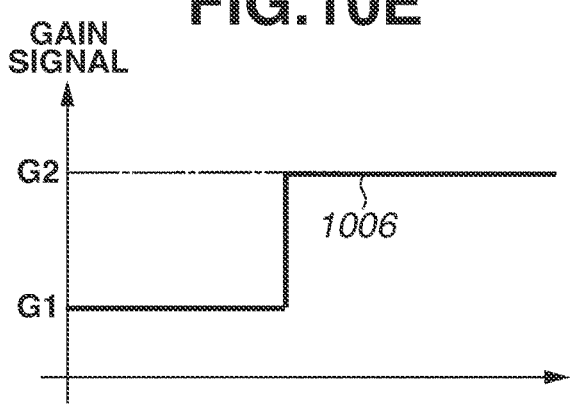
Figure 10C:
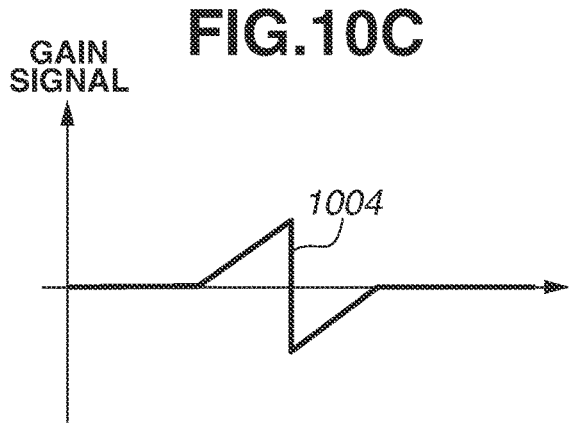
Figure 10F:
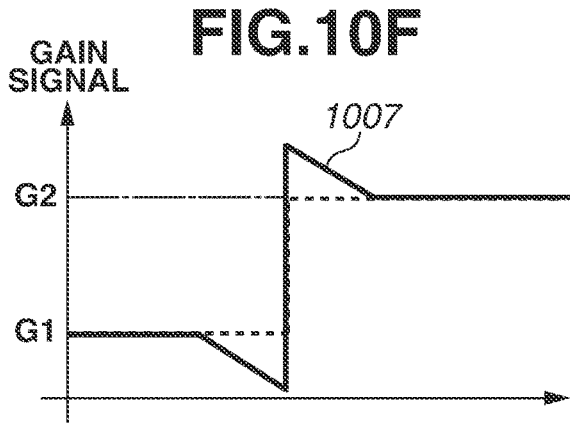
Figure 10D:
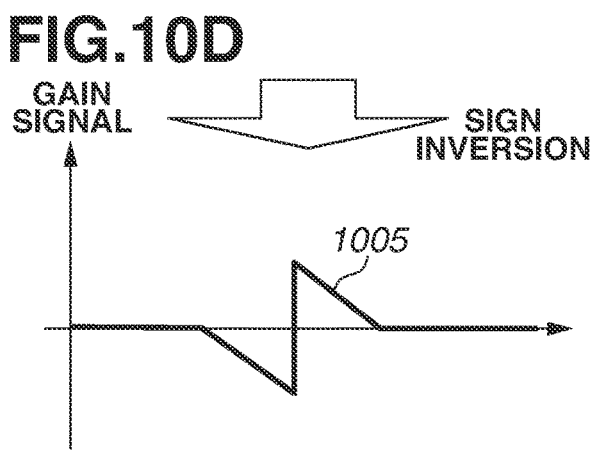

Further, in the second exemplary embodiment, the gain map correction processing unit 107 generates the final gain map by adding the gain map correction signal indicated by the solid line 1005 illustrated in FIG. 10D and the gain value in the reference gain map indicated by a solid line 1006 illustrated in FIG. 10E. In the second exemplary embodiment, the final gain map as indicated by a solid line 1007 illustrated in FIG. 10F is obtained. Thus, the processing in the second exemplary embodiment differs from the processing in the first exemplary embodiment described above in that sign inversion processing is additionally performed when the gain map correction signal is generated.

As described above, according to the image processing apparatus according to the first and second exemplary embodiments, the local tone mapping processing that enables improvement in contrast as compared with the global tone mapping processing in either case where the tone characteristic that monotonically decreases is set, or the tone characteristic that monotonically increases is set.

The present disclosure can also be implemented by processing in which a program for implementing one or more functions according to the exemplary embodiments described above is supplied to a system or apparatus via a network or storage medium, and one or more processors in a computer of the system or apparatus read out the program and execute the program. The present disclosure can also be implemented by a circuit (e.g., ASIC) for implementing one or more functions according to the exemplary embodiments described above.

The exemplary embodiments described above merely illustrate specific examples for carrying out the present disclosure, and the technical scope of the present invention should not be limitedly construed. In other words, the present disclosure can be carried out in various ways without departing from the technical idea or main features of the present disclosure.

Other Embodiments

Embodiment(s) of the present disclosure can also be realized by computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-020228, filed Feb. 7, 2017, which is hereby incorporated by reference herein in its entirety.

What is claimed is:

1. An image processing apparatus comprising:
at least one processor and/or circuit configured to:
generate reference gain information by replacing the luminance value of each pixel of an input image with the gain value of a first tone characteristic corresponding to said luminance value, the first tone characteristic including a luminance range in which a gain signal monotonically increases;
generate a correction signal to correct the reference gain information based on a second tone characteristic in which the gain signal monotonically decreases or monotonically increases regardless of the luminance range by using the input image and a low-frequency image generated from the input image; and
perform gain processing on the input image based on gain information obtained after the reference gain information is corrected by the correction signal.

2. The image processing apparatus according to claim 1, wherein the at least one processor and/or circuit further configured to,
generate first gain information by replacing the luminance value of each pixel of the input image with the gain value of the second tone characteristic corresponding to said luminance value,
generate second gain information by replacing the luminance value of each pixel of the low-frequency image with the gain value of the second tone characteristic corresponding to said luminance value, and
generate, as the correction signal, a difference between the first gain information and the second gain information.

3. The image processing apparatus according to claim 2, further comprising a correction unit configured to generate gain information obtained after the difference is added to the reference gain information to correct the reference gain information by the correction signal.

4. The image processing apparatus according to claim 1, wherein the at least one processor and/or circuit further configured to, generate first gain information by replacing the luminance value of each pixel of the input image with the gain value of the second tone characteristic corresponding to said luminance value,
perform reduction processing on the input image to generate a plurality of low-frequency images having different frequency levels, and combines a plurality of pieces of gain information, each generated by replacing the luminance value of each pixel of one of the plurality of low-frequency images, respectively, with the gain value of the second tone characteristic corresponding to said luminance value, to generate the second gain information, and
generate as the correction signal, a difference between the first gain information and the second gain information.

5. The image processing apparatus according to claim 1, wherein the at least one processor and/or circuit further configured to, generate the first tone characteristic based on the input image, and generate the second tone characteristic based on the first tone characteristic.

6. The image processing apparatus according to claim 5, wherein the at least one processor and/or circuit further configured to, generate the second tone characteristic in which the gain signal monotonically decreases by inverting a gradient of a characteristic portion that monotonically increases in the first tone characteristic and by replacing the characteristic portion of the first tone characteristic with the gradient-inverted version of said characteristic portion.

7. The image processing apparatus according to claim 5, wherein the at least one processor and/or circuit further configured to, generate the second tone characteristic in which the gain signal monotonically increases by inverting a gradient of a characteristic portion that monotonically decreases in a tone characteristic obtained after a sign of a characteristic in an entire luminance range of the first tone characteristic is inverted and by replacing the characteristic portion of the first tone characteristic with the gradient-inverted version of said characteristic portion.

8. The image processing apparatus according to claim 1, wherein the input image is an image including a luminance signal.

9. An image processing method for an image processing apparatus, the method comprising:

generating reference gain information by replacing the luminance value of each pixel of an input image with the gain value of a first tone characteristic corresponding to said luminance value, the first tone characteristic including a luminance range in which a gain signal monotonically increases;

generating a correction signal to correct the reference gain information based on a second tone characteristic in which the gain signal monotonically decreases or monotonically increases regardless of the luminance range by using the input image and a low-frequency image generated from the input image; and performing gain processing on the input image based on gain information obtained after the reference gain information is corrected by the correction signal.

10. A non-transitory, computer-readable storage medium storing a program for causing a computer to execute a method comprising:

generating reference gain information by replacing the luminance value of each pixel of an input image with the gain value of a first tone characteristic corresponding to said luminance value, the first tone characteristic including a luminance range in which a gain signal monotonically increases;

generating a correction signal to correct the reference gain information based on a second tone characteristic in which the gain signal monotonically decreases or monotonically increases regardless of the luminance range by using the input image and a low-frequency image generated from the input image; and performing gain processing on the input image based on gain information obtained after the reference gain information is corrected by the correction signal.

* * * * *